Feb. 21, 1961 R. H. HENWOOD 2,972,206
ANIMAL TRAP
Filed Aug. 26, 1957 2 Sheets-Sheet 1
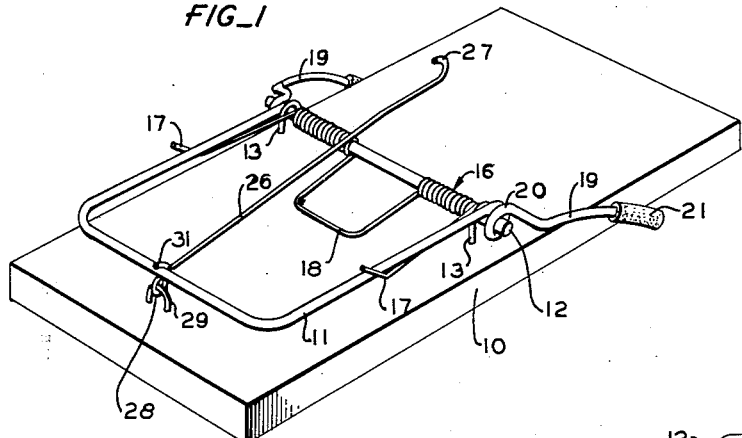
FIG_1
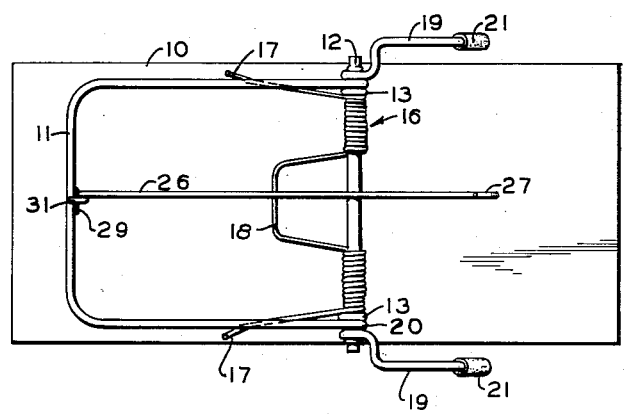
FIG_2
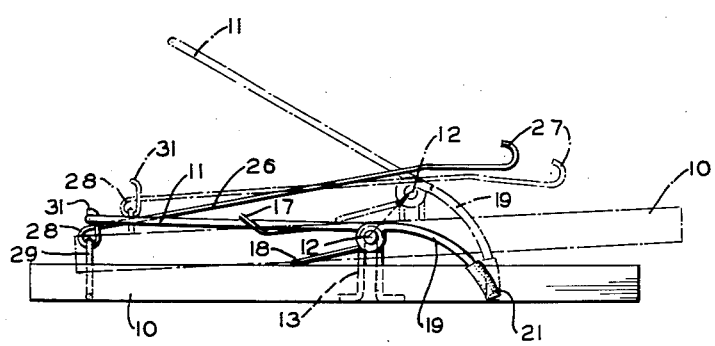
FIG_3
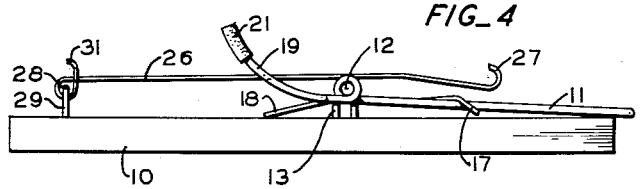
FIG_4
INVENTOR.
RUSSELL H. HENWOOD
BY
Allen and Chromy
ATTORNEYS Feb. 21, 1961   R. H. HENWOOD   2,972,206
ANIMAL TRAP
Filed Aug. 26, 1957   2 Sheets-Sheet 2
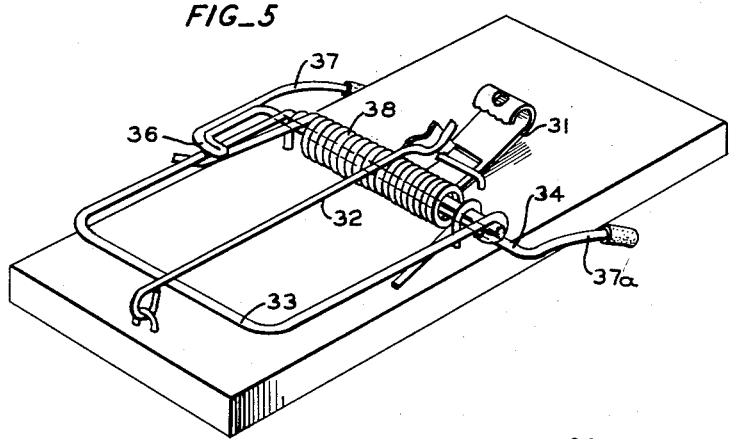
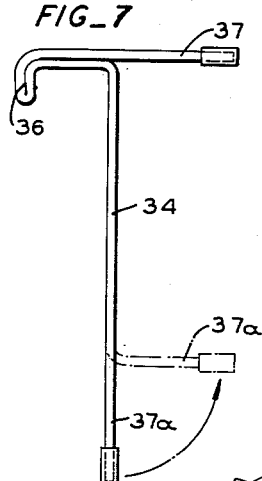
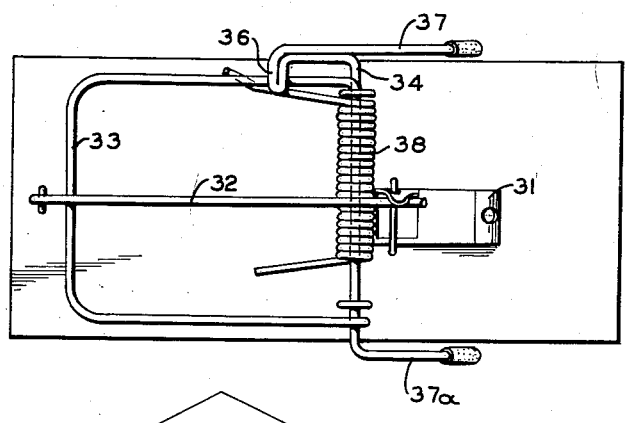
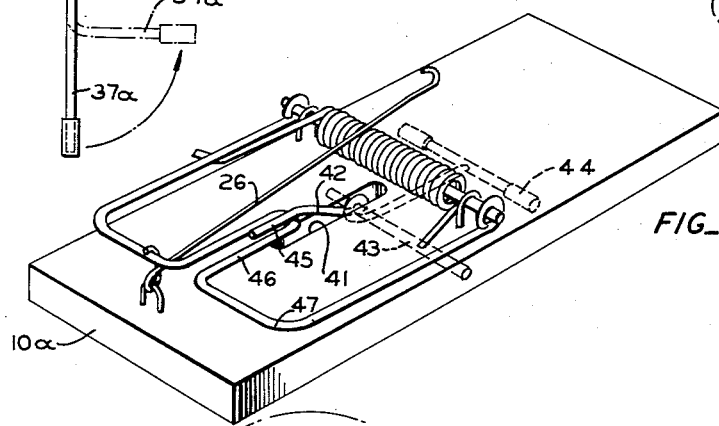
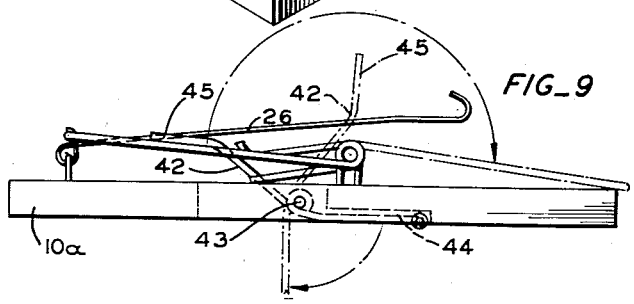
INVENTOR.
RUSSELL H. HENWOOD
BY
*Allen and Chromy*
ATTORNEYS

United States Patent Office 2,972,206
Patented Feb. 21, 1961

2,972,206

ANIMAL TRAP

Russell H. Henwood, 15470 Quito Road, Saratoga, Calif.

Filed Aug. 26, 1957, Ser. No. 680,076

7 Claims. (Cl. 43—81)

The present invention relates to animal traps, such as mouse traps, and is concerned more particularly with a new trap construction whereby at the time the trap is sprung it is propelled in the general direction of the animal springing it so as to enhance the percentage of caught animals, or animals killed by the trap.

With conventional animal traps quite often the trap is sprung without a dead animal resulting, and I have found that in a trap which is propelled as a missile toward the animal springing the trap that the percentage of animals killed by the trap is substantially increased and that very few, if any, animals will escape the lethal action of the trap.

It is a general object of the invention therefore to provide an animal trap which will increase substantially the percentage of animals killed by the trap.

Another object of the invention is to provide an animal trap having means for propelling the trap toward the animal at the time of springing of the trap.

A further object of the invention is to provide an animal trap having an improved trigger mechanism.

Another object of the invention is to provide a trap attaining the above objects in which the propelling means is formed as an attachment which can be placed on a conventional trap.

The above and other objects of the invention are attained as described in the following specification. Taken in connection with the accompanying drawings, in which:

Fig. 1 is a perspective view of a trap embodying my invention, the trap being shown in set position;

Fig. 2 is a plan view of the trap shown in Fig. 1;

Fig. 3 is a side elevational view of the trap shown in Fig. 1, showing in dotted lines the position of the parts at approximately the instant of springing;

Fig. 4 is a side elevational view of the trap in sprung position;

Fig. 5 is a perspective view of a trap in which, my propelling unit is shown as an attachment to a conventional trap;

Fig. 6 is a plan view of the trap shown in Fig. 5;

Fig. 7 is a view of the propelling means as an attachment;

Fig. 8 is a perspective view of a modified form of my animal trap;

Fig. 9 is a side elevational view of the trap shown in Fig. 8, showing the trap in set position in full lines, and in sprung position in dotted lines.

Referring to Figs. 1–4, my new trap is shown as embodying propelling means which is operative upon springing of the striker or jaw, to move the trap in the general direction of movement of the striker, i.e. toward an animal nibbling at the bait on the trigger. The trap includes a base 10 of generally rectangular form, on which there is mounted, a striker or bail 11, which is coiled at 20 to engage the two ends of a pivot rod 12, the pivot 12 being secured in place on the base 10 by a pair of U-shape staples 13. A coil spring 16 is provided about the rod 12 having respective ends 17 engaged over the bail 11, and having an offset center portion 18 engaging against the base 10 as a stop so that it urges the bail rapidly from its set position as shown in Fig. 1 to its sprung position as shown in Fig. 4.

The propelling means of my invention as illustrated in this embodiment comprises extensions 19 at either end of the coiled front portions 20 of the bail, which extend outwardly at either side of the base 10 and have surface engaging cap portions 21 of rubber or other suitable material placed on its ends. These propelling arms 19 in the set position of the trap, slant downwardly and terminate closely adjacent to the surface on which the trap is set, and upon springing of the trap, the propelling arms 19 engage this surface as the bail 11 moves clockwise as shown in the drawings, and propels the trap for several inches in the general direction of the animal, to make the trap itself form a missile as well as a catching medium.

The improved trigger mechanism and bait holder of my invention comprises a wire 26 having a bent bait holding end 27, and formed at its other end with a loop 28 to engage about a staple 29 so that its bent latch end 31 can engage the bail 11 from the inside of the bail and retain the trap in set position so that the slightest movement of the bait holding end 27 will effect release of the bail 11.

Referring to Figs. 5–7, there is shown a form of the invention employing a conventional animal trap in the form of a mouse trap including a conventional bait holder 31 and a conventional latch bar 32 for the conventional bail 33. As shown in particular in Fig. 7, the propelling attachment for the trap comprises a bar 34, which is bent at one end into an irregular shape providing a portion 36 for overlying the bail 33 and a propelling arm 37 at its ends. The other propelling arm 37a is normally straight until inserted in the trap, and then is bent at right angles as shown in dotted lines in Fig. 7 to be in propelling position. As shown in Figs. 5 and 6, this propelling attachment 34 is inserted through and pivots in the spring 38 for the bail 33 with the two propelling arms 37 and 37a lying at either side of the trap and operating in the same manner as described in connection with Figs. 1–4.

Referring to Figs. 8 and 9, a further modified form of the invention is shown in which the base 10a is centrally slotted or recessed at 41 to provide a mounting for a trap propelling arm 42 on a pin 43. This propelling arm is provided with a transverse propelling bar 44 at one end. The other end 45 of the arm 42 overlies a U-shaped bend 46 in the bail 47. The trigger mechanism and bait holder 26 is in the same form as shown in Fig. 1.

As seen in Fig. 9, when the trap is sprung, the propelling bar 44 of the propelling arm 42 engages the surface and propels the trap in the general direction of the animal springing the trap.

It will be noted with reference to all forms of the invention that the propelling arms in addition to propelling the trap in the direction of its bait end also act to lift the trap free of the surface on which it rests so that if the animal such as a mouse or other rodent jumps upwardly as a result of the sound incurred in springing the trap it will still be in position to be caught or hit by the striker or by another portion of the trap.

While I have shown and described certain preferred embodiments of the invention, it will be apparent that the invention is capable of further variation and modification, so that its scope should be limited only by the scope of the claims appended hereto.

I claim:
1. An animal trap comprising a rectangular base, a striker pivotally mounted on said base, spring means urging said striker from a set position to a sprung position at the bait end of the trap, a latch arm for said striker, and surface engaging propelling means associated with said striker for actuation thereby and comprising a pair of arms disposed in angular relation to the surface on which the trap rests at either side of the trap in the set position thereof so as to propel the trap in a generally horizontal direction along the length of said base in the direction of the bait end of the trap, each of said arms terminating in an end presented to said surface at a location intermediate the ends of said base.

2. An animal trap comprising a rectangular base, a striker pivotally mounted on said base, spring means urging said striker from a set position to a sprung position at a bait end of the trap, a latch arm for said striker, and surface engaging propelling means associated with said striker for actuation thereby and comprising an arm disposed in angular relation to the surface on which the trap rests in the set position thereof and terminating in an end presented to said surface at a location intermediate the ends of said base so as to propel the trap in a generally horizontal direction along the length of said base in the direction of the bait end of the trap.

3. An animal trap as described in claim 2 in which the propelling means is formed as end extensions of the bail or striker of the trap.

4. An animal trap as described in claim 2 in which the propelling means is formed as an arm extending through and disposed centrally of the base.

5. In an animal trap as described in claim 2 in which the propelling means is formed with a portion overlying said bail in order to be moved therewith from set position to actuate the surface engaging propelling means.

6. In an animal trap as recited in claim 2 in which the propelling means is in the form of an attachment pivoted in the spring means of the trap and having end extensions embracing the side edges of the trap, and also having a portion overlying the striker in the set position thereof.

7. An attachment for an animal trap of the type having a base, a bail type striker pivotally mounted on said base, coil type spring means disposed co-axially with said striker at its point of mounting and operable to urge said striker from a set position to a sprung position at a bait end of the trap, a latch and bait holder means for maintaining the striker in its set position until movement of said means by an animal nibbling at the bait; said attachment comprising a rod having an intermediate pivotal portion for pivotal positioning in said coil spring means, respective end portions on said rod for positioning at either side of the base for engagement with the surface on which the base rests at a location intermediate the ends of the base, an actuating extension extending oppositely from one of said arms and having an end formed to overlie said bail type striker in the set position thereof, in which position said arms are positioned to propel the trap toward the bait end thereof upon actuation.

References Cited in the file of this patent

UNITED STATES PATENTS

| | | |
|---|---|---|
| 986,256 | Willis | Mar. 7, 1911 |
| 1,992,294 | Eycleshymer | Feb. 26, 1935 |
| 2,059,119 | Korbisser | Oct. 27, 1936 |
| 2,124,227 | Bilinski | July 19, 1938 |
| 2,511,519 | Van Brunt | June 13, 1950 |

FOREIGN PATENTS

| | | |
|---|---|---|
| 744,730 | France | 1933 |